(12) United States Patent
Nadathur et al.

(10) Patent No.: US 7,451,286 B2
(45) Date of Patent: Nov. 11, 2008

(54) REMOVABLE PORTABLE DATA BACKUP FOR A NETWORK STORAGE SYSTEM

(75) Inventors: Gokul S. Nadathur, Fremont, CA (US); Aseem Vaid, Santa Clara, CA (US)

(73) Assignee: Network Appliance, Inc., Sunnyvale, CA (US)

( * ) Notice: Subject to any disclaimer, the term of this patent is extended or adjusted under 35 U.S.C. 154(b) by 288 days.

(21) Appl. No.: 11/489,045

(22) Filed: Jul. 18, 2006

(65) Prior Publication Data

US 2008/0022058 A1  Jan. 24, 2008

(51) Int. Cl.
*G06F 12/00* (2006.01)
(52) U.S. Cl. .................................... 711/162
(58) Field of Classification Search ............... 711/114, 711/162; 707/204; 714/6
See application file for complete search history.

(56) References Cited

U.S. PATENT DOCUMENTS

| | | | |
|---|---|---|---|
| 6,167,494 A * | 12/2000 | Cheston et al. ............. | 711/162 |
| 6,526,418 B1 | 2/2003 | Midgley | |
| 6,675,177 B1 | 1/2004 | Webb | |
| 2002/0069318 A1 * | 6/2002 | Chow et al. ................. | 711/104 |
| 2003/0046470 A1 * | 3/2003 | Sivertsen .................... | 710/304 |
| 2004/0236958 A1 | 11/2004 | Teicher | |
| 2007/0094464 A1 * | 4/2007 | Sharma et al. .............. | 711/162 |

* cited by examiner

*Primary Examiner*—Hiep T Nguyen
(74) *Attorney, Agent, or Firm*—Blakely, Sokoloff, Taylor & Zafman LLP (57) ABSTRACT

A storage server creates a first mirror of a primary volume of data on a first storage set that includes at least one disk and creates a second mirror of the primary volume, on a second storage set that also includes at least one disk. The server then quiesces the second storage set. A user then decouples the second storage set from the server and transports the second storage set off-site. The storage server then saves one or more incremental backups of the primary volume on the first storage set according to a specified backup schedule. According to a specified rotation schedule, a user subsequently recouples the second storage set to the server. The server detects the recoupling and, in response, automatically resynchronizes the second mirror with the primary volume, and swaps the active-inactive statuses of the first and second mirrors. The process repeats as needed.

22 Claims, 8 Drawing Sheets

| Timeline | Disk A: $V_{1A}$ | Disk B: $V_{1B}$ |
|---|---|---|
| Week1 | Baseline PPI | Baseline PPI |
| | Daily incremental.1 | Break mirror; off-site ready. Take off-site |
| | Daily incremental.2 | |
| | ... | |
| | Daily incremental.7 | |

| Week2 | Break mirror; off-site ready. | Rotate disk back in. Resync |
|---|---|---|
| | | Daily incremental.1 |
| | | Daily incremental.2 |
| | | ... |
| | | Daily incremental.7 |

REMOVABLE PORTABLE DATA BACKUP FOR A NETWORK STORAGE SYSTEM

A portion of the disclosure of this patent document contains material which is subject to copyright protection. The copyright owner has no objection to the facsimile reproduction by anyone of the patent document or the patent disclosure, as it appears in the Patent and Trademark Office patent file or records, but otherwise reserves all copyright rights whatsoever.

FIELD OF THE INVENTION

At least one embodiment of the present invention pertains to network storage systems, and more particularly, to removable portable data backup solution for a network storage server.

BACKGROUND

Various forms of network storage systems exist today, including network attached storage (NAS), storage area networks (SANs), and others. Network storage systems are commonly used for a variety of purposes, such as backing up critical data, providing multiple users with access to shared data, etc.

A network storage system includes at least one storage server, which is a processing system configured to store and retrieve data on behalf of one or more client processing systems ("clients"). In the context of NAS, a storage server is commonly a file server, which is sometimes called a "filer". A filer operates on behalf of one or more clients to store and manage shared files. The files may be stored in a storage subsystem that includes one or more arrays of mass storage devices, such as magnetic or optical disks or tapes, by using RAID (Redundant Array of Inexpensive Disks). Hence, the mass storage devices in each array may be organized into one or more separate RAID groups.

In a SAN context, a storage server provides clients with access to stored data at a sub-file level of granularity, such as block-level access, rather than file-level access. Some storage servers are capable of providing clients with both file-level access and block-level access, such as certain Filers made by Network Appliance, Inc. (NetApp®) of Sunnyvale, Calif.

As noted above, backing up data is a common use of a network storage system. There is a particular need for good backup solutions for network storage at the enterprise level, particularly (though not exclusively) for small and medium businesses (SMBs). Many SMB users do not want to invest in or maintain separate backup software, servers and systems, and do not have effective operational processes for managing data or media. Such users want an easy-to-use, integrated solution for disaster recovery (DR) or archiving data, which can be set up and operated by office staff or information technology (IT) generalists.

In this context, it is often desirable to have an easy-to-use, cost-effective data backup solution for network storage, according to which backup copies of the primary data are stored "offsite", i.e., at a location which is remote with respect to the location of the primary data. Further, it is often desirable to have such a solution which is also reliable, easily portable and which enables relatively fast storage and retrieval of data.

Various backup solutions for network storage are known, all of which have shortcomings relative to the above-noted criteria. For example, one possible approach is to provide a complete mirroring system at a remote site, to mirror the data at the primary site. The mirroring system includes a separate storage server and accompanying storage devices (e.g., disks). Consequently, this approach tends to be expensive and is not very portable.

Another common approach is to save backup copies of data onto tapes. This solution requires separate tape drives and, therefore, also tends to be expensive and not very portable. In addition, tape drives tend to be slower and less robust than disk drives, which are typically used for primary storage.

Other known approaches to data backup include those designed for use on individual personal computers (PCs). For example, recent versions of the Microsoft Windows operating system have the ability to generate a point-in-time image of a particular drive (e.g., the "C:" drive) onto another drive. This approach and other approaches designed for use on individual PCs are not suitable for use on a large-scale, in network storage systems.

SUMMARY OF THE INVENTION

The present invention includes a storage server and a method of operating a storage server. The method comprises: providing data storage and retrieval services via a network to a client; creating a first mirror volume of a primary volume, on a first storage set that includes a non-volatile mass storage device; creating a second mirror volume of the primary volume, on a second storage set that includes a non-volatile mass storage device; quiescing the second storage set; detecting a decoupling of the second storage set from the storage server; creating an incremental backup of the primary volume on the first storage set while the second storage set is not coupled to the storage server; detecting a re-coupling of the second storage set to the storage server; and in response to detecting the re-coupling, synchronizing the second mirror volume with the primary volume, and swapping active-inactive statuses of the first and second storage sets.

Other aspects of the invention will be apparent from the accompanying figures and from the detailed description which follows.

BRIEF DESCRIPTION OF THE DRAWINGS

One or more embodiments of the present invention are illustrated by way of example and not limitation in the figures of the accompanying drawings, in which like references indicate similar elements and in which.

DETAILED DESCRIPTION

An easy-to-use, cost-effective, reliable and highly portable data backup solution for a network storage system is described. References in this specification to "an embodiment", "one embodiment", or the like, mean that the particular feature, structure or characteristic being described is included in at least one embodiment of the present invention. Occurrences of such phrases in this specification do not necessarily all refer to the same embodiment.

The backup solution being introduced here creates, in certain embodiments, single-disk, removable backup sets of the primary data. A backup disk can be removed from the network storage system and stored offsite. As will be apparent from the description which follows, the solution is easy to use and relatively inexpensive, making it particularly well-suited to SMBs, although it can be useful in other contexts as well.

It is assumed for purposes of this description that, in a storage server to be backed up, the primary data is protected against disk failures by an implementation of RAID, such as RAID-4, RAID-5 or RAID-DP. A hot spare can also be configured. It is further assumed that persistent point-in-time images (PPIs) of data can be captured on the storage server, to enable file level recovery. These features generally provide some data protection for the primary data. One purpose of the in-box backup solution introduced here, however, is to add an integrated off-site protection solution for the primary data. Such capability complements the RAID-plus-spare protection, which addresses local failures. Together, these techniques provide a very effective "all-in-one" data protection solution.

According to the solution introduced here, as described further below, a storage server creates a first PPI (a first "mirror", which is a full backup) of a primary data volume on a first storage set. The first storage set is a set of one or more removable, non-volatile mass storage devices (e.g., one or more removable disks). The PPI is a mirror of the primary data volume. The storage server also creates a second PPI (a second full backup, or "mirror") of the primary data volume on a second storage set. The second storage set is also a set of one or more removable, non-volatile mass storage devices (e.g., one or more removable disks). In a simple embodiment, the first and second storage sets each include a single removable disk that together are treated as a backup disk pair. Note that the storage server can include one or more storage sets in addition to the first and second storage set. In certain embodiments, the storage server maintains a primary aggregate that comprises one or more disks, and the first and second storage sets are in addition to the primary aggregate.

After creating the mirrors, the server quiesces (deactivates) the second storage set by suspending any further backup to that storage set and spinning down its disk(s). A user, such as a network administrator, then decouples the second storage set from the storage server and takes the second storage set (which, as noted, can be a single disk) off-site, to a safe, remote storage location. The storage server then initiates a specified backup schedule, saving one or more incremental backups of the primary volume on the first storage set.

Later, at a time arbitrarily determined by the user or a specified rotation schedule, the user recouples the second storage set to the storage server. The user may be prompted to do this by software running on the storage server. The storage server detects the recoupling of the second storage set and, in response, resynchronizes the second mirror volume with the primary volume, and then swaps the active-inactive statuses of the first and second storage sets. This process then repeats, i.e., the user decouples the first storage set from the storage server and takes it off-site, and the storage server saves one or more incremental backups of the primary volume on the second storage set, until the first storage set is recoupled to the server, and so forth.

In the event of loss, corruption or inaccessibility of the primary volume, the data can be quickly and easily recovered from the mirror volume on the offsite storage set (in contrast, recovery of data from backup tapes is typically slow and tedious). The offsite storage set is simply recoupled to the storage server, and a restore command is input by the user. The data can be recovered as of the time of the full backup on the backup storage set or as of any subsequent incremental backups that may still be intact and accessible on the storage set that experienced the problem.

In this document, the term "incremental" backup is used in contrast with a full backup, in that "incremental" backup refers to a backup dataset (or the process which creates it) that does not include the complete original dataset. An incremental backup only includes the changes relative to the original dataset or a prior non-full backup. Therefore, the term "incremental" backup, as used herein, is also intended to include what are commonly referred to as "differential" backups, unless stated otherwise.

Figure 1:
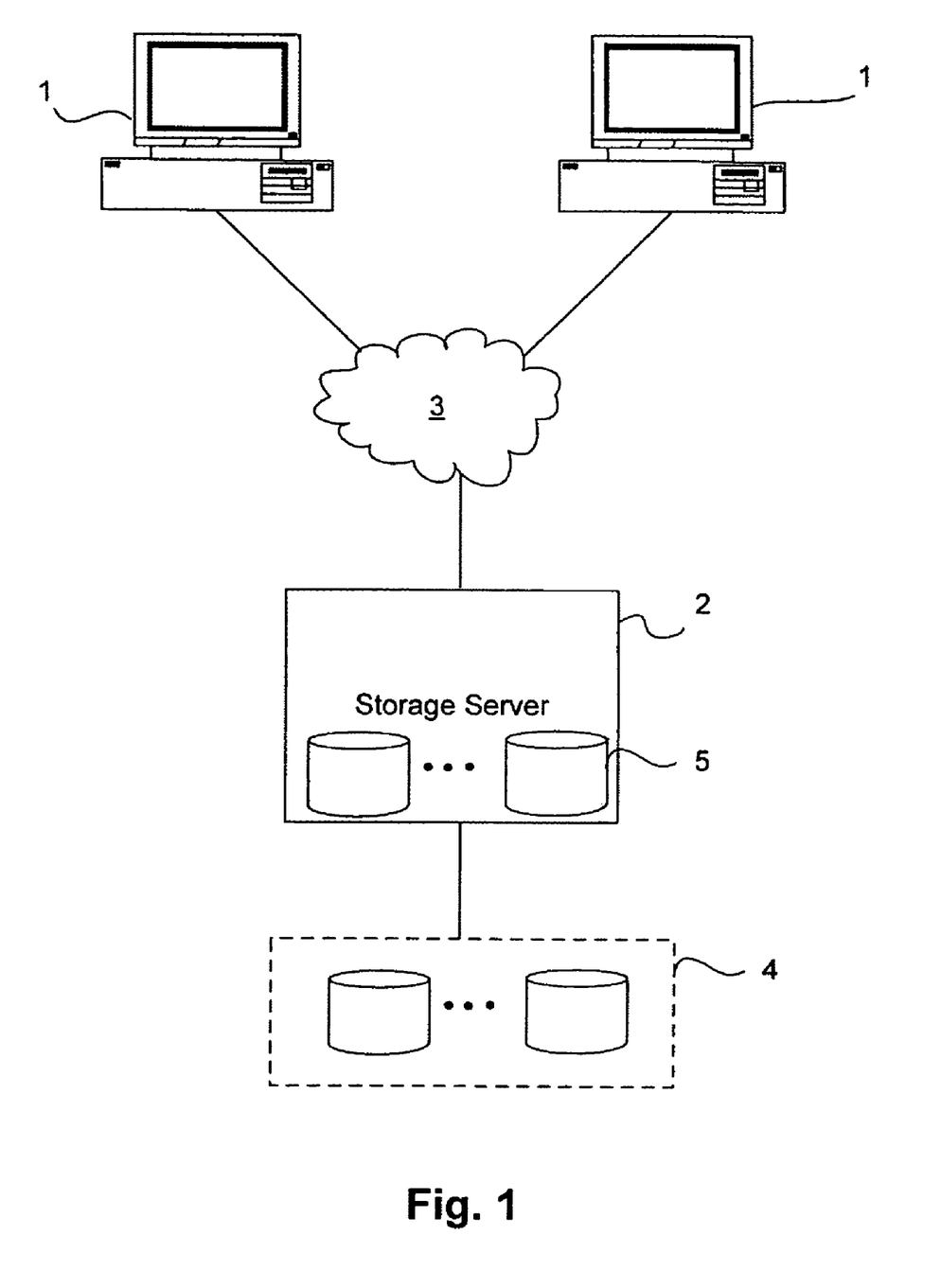
FIG. 1 shows a simple example of a network environment which incorporates a storage server.

FIG. 1 shows a simple example of a network environment which incorporates a storage server 2, in which the solution introduced here can be implemented. The storage server 2 has a number of removable, internal, non-volatile mass storage devices 5, such as magnetic or optical based disks. The storage server 2 may also be coupled (as shown) to an external storage subsystem 4 which also includes a set of removable, internal, non-volatile mass storage devices, such as magnetic or optical based disks. The storage server 2 is also coupled to a set of storage clients 1 (hereinafter simply "clients") through a network 3. The network 3 may be, for example, a local area network (LAN), a wide area network (WAN), a global area network (GAN) such as the Internet, or a combination of such networks. Each of the clients 1 may be, for example, a conventional personal computer (PC), workstation, or the like.

Data stored in the internal mass storage devices 5 and the external storage subsystem 4 is managed by the storage server 2. The storage server 2 receives and responds to various read and write requests from the clients 1, relating to data maintained by the storage server 2.

Figure 2:
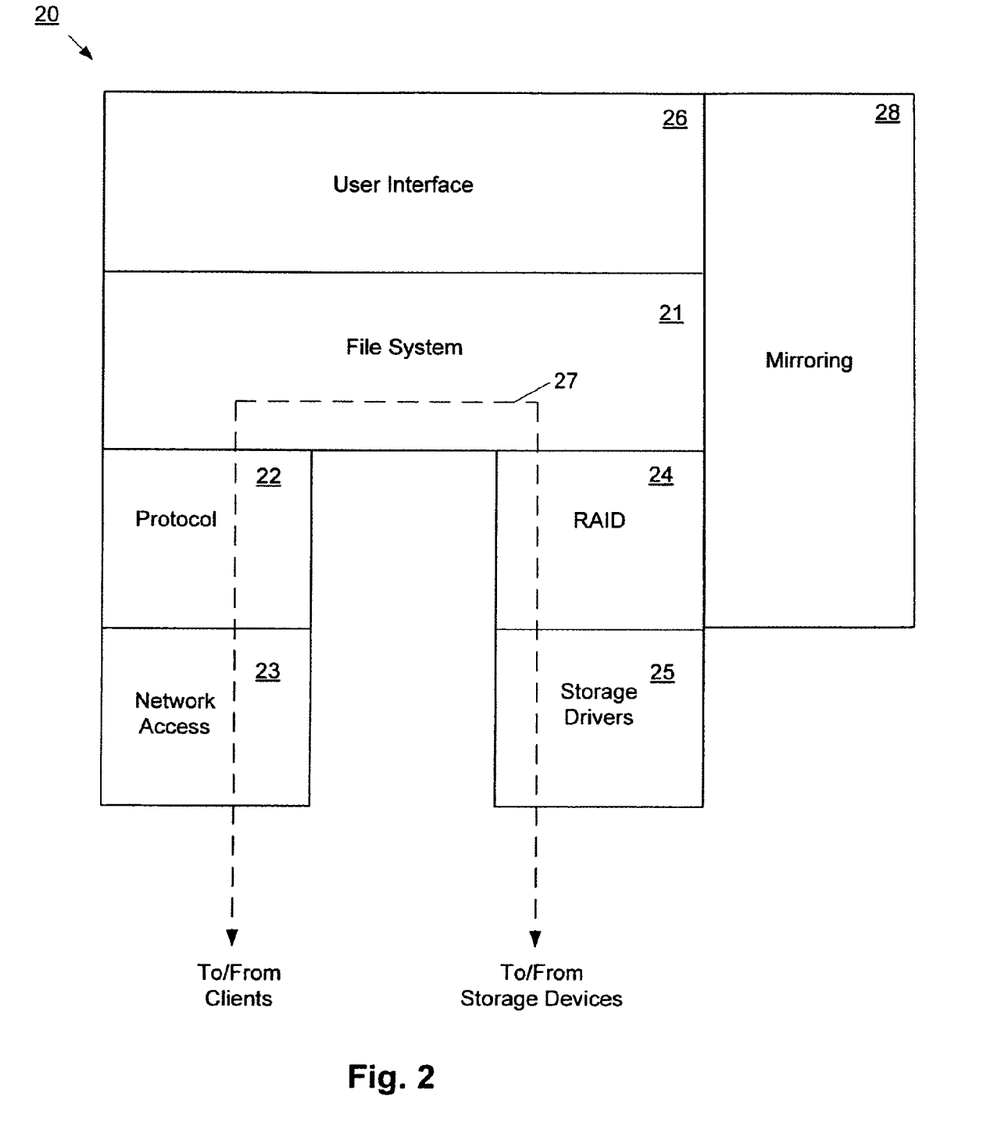
FIG. 2 shows an example of the architecture of the operating system of the storage server.

The storage server 2 includes an operating system to control its operation, an example of which is shown in FIG. 2. The operating system 20 is preferably implemented as software. However, in some embodiments, some or all of the elements of the operating system 20 may instead be implemented in the form of hardware (e.g., specially designed circuitry), or as a combination of hardware and software.

As shown, the operating system 20 includes several modules, or "layers". These layers include a file system manager 21. The file system manager 21 is (in at least one embodiment) software that manages the one or more file systems managed by the storage server 2. A "file system", as the term is used here, is a structured (e.g. hierarchical), independently managed, self-contained set of stored data, such as files, directories and/or other types of data containers. The file system manager 21 imposes a hierarchy (e.g., a directory/file structure) on the stored data and manages client-initiated read and write operations at a high level (while delegating certain functions to lower layers of the operation system 20).

To allow the storage server 2 to communicate over the network 3 (e.g., with clients 1), the operating system 20 also includes a network access layer 22, and a protocol layer 22 operatively coupled between the file system manager 21 and the network access layer 23. The network access layer 23 includes one or more drivers which implement one or more lower-level protocols to communicate over the network, such as Ethernet or Fibre Channel.

The protocol layer 22 implements a number of higher-level network protocols, such as Network File System (NFS), Common Internet File System (CIFS), Hypertext Transfer Protocol (HTTP) and Transmission Control Protocol/Internet Protocol (TCP/IP). The protocol layer 22 includes separate modules to implement each of these protocols. Each module is responsible for translating commands and other messages received over the network 3 into a format that is understandable by the file system manager 21, and for translating responses and other messages generated by the file system manager 21 into the appropriate protocol being used by a particular client, for transmission over the network 3.

To enable the storage server 2 to communicate with its internal mass storage devices 5 and the external storage subsystem 4, the operating system 20 also includes a storage driver layer 25, and a storage redundancy layer 24 operatively coupled between the file system manager 21 and the storage driver layer 25. The storage access layer 24 implements a higher-level disk redundancy protocol, such as RAID-4, RAID-5 or RAID-DP, while the storage driver layer 25 implements a lower-level storage device access protocol, such as Fibre Channel Protocol (FCP) or SCSI. The storage access layer 24 is alternatively called the "RAID layer" in this description.

The operating system 20 also includes a user interface 26 to generate a command line interface (CLI) and/or graphical user interface (GUI), to allow administrative control and configuration of the storage server 2, from a local or remote terminal. Also shown in FIG. 2 is the path 27 of data flow, through the operating system 20, associated with a client-initiated read or write request.

The operating system also includes a mirroring layer 28, which interfaces with the user interface 26, the file system manager 21 and the RAID layer 24. The mirroring layer 28 implements at least some of the functionality described herein, such as the creation of PPIs and incremental backups, prompting the user to rotate primary and backup disks, restoring from backups, etc. Note that the mirroring layer 28 does not have to be implemented as an element of the operating system 20; rather, it can be implemented as a separate, self-contained software package.

Secondary media protection is desirable to support an adequate level of reliability and continuous data protection (CDP) for a removable/DR solution. To achieve this, according to at least one embodiment of the invention, backup disks are organized in pairs, as noted above. Other embodiments of the invention may instead use pairs of storage sets where each storage set includes two or more disks. At any point in time, one disk in the pair should be installed in (or at least operatively coupled to) the storage server 2, while the other one should be kept offsite (operatively decoupled from the storage server 2). For purposes of this description, the term "installed" means at least operatively coupled to the storage server 2 and can also mean (but not necessarily) physically within the housing of the storage server 2. Similarly, for purposes of this description, the term "remove" means at least to operatively decouple the device from the storage server 2 and can also mean (but not necessarily) to physically take the device out of the housing of the storage server 2 if it resided there.

The storage server 2 automatically treats whichever disk is installed as an active backup target. Either of the disks in the pair can be removed and taken offsite or brought back into the system by the user with no data synchronization required.

When both disks in the pair are installed in the storage server 2, software in the storage server 2 (e.g., the mirroring layer 28) will automatically enforce a default target rotation schedule and notify the user of the need to take backups offsite or to rotate disk media. However, the user can follow any practical rotation schedule or no rotation schedule at all (which fits the use-case of the "part-timer admin" and "best efforts" offsite protection paradigm). For both backup/restore and archiving purposes, the mirroring layer 28 maintains a catalog that helps identify disks, recover data, reduce the chance of data management accidents and guide users through safe practices.

Figure 3:
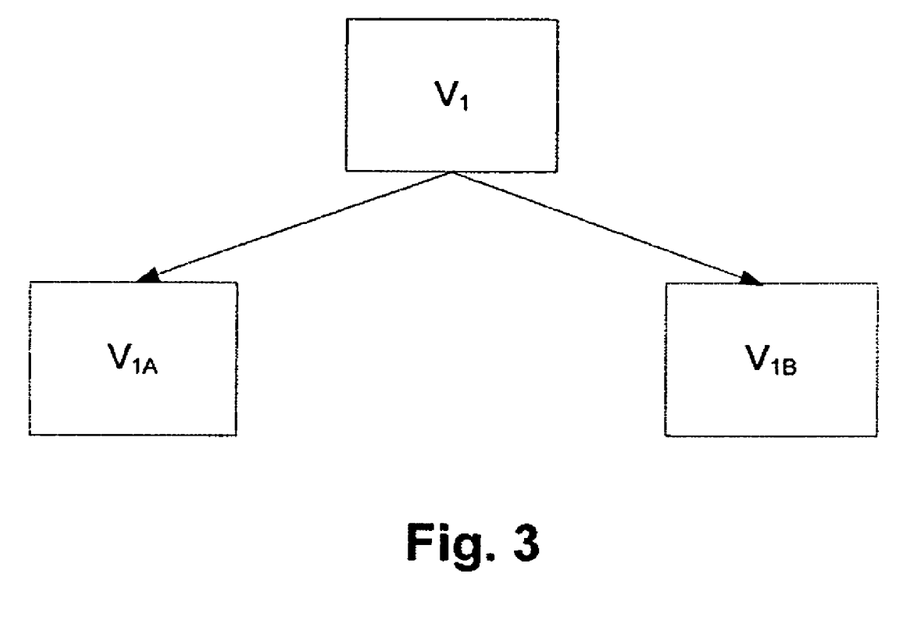
FIG. 3 conceptually illustrates a primary volume being split into two mirror volumes.

Referring now to FIG. 3, the storage server 2 maintains a primary volume of data, $V_1$, which is to be backed up according to the solution introduced here. Accordingly, the storage server 2 creates two mirrors of the primary volume $V_1$, $V_{1A}$ and $V_{1B}$, only one of which is active at a time, while the other is inactive (i.e., passive, or "quiesced"). Mirror volumes $V_{1A}$ and $V_{1B}$ are stored on separate disks of a removable backup disk pair.

There are at least two ways in which the removable disk pair can be organized. One way is to configure the disk pair as a single RAID-1 aggregate. Another way is to configure the disk pair as two separate RAID-0 aggregates. An "aggregate" is a logical aggregation of physical storage; i.e., a logical container for a pool of storage, combining one or more physical mass storage devices (e.g., disks) or parts thereof into a single logical storage object, which contains or provides storage for one or more other logical data sets at a higher level of abstraction (e.g., volumes).

An advantage of using the RAID-1 approach is that the complete history of backups can be made available on a single disk. However, since one disk is always off-site, the aggregate is always degraded. Disk rotation involves inserting the off-site disk back into the system, rebuilding the RAID-1 mirror and removing the in-box disk. This is not a predictably fast operation. Consequently, the RAID-1 implementation may not be well-suited for the use case of part-time operations staff who should be able to rotate media instantly without any data synchronization steps.

In the approach that uses two RAID-0 aggregates, when one disk in the pair is taken off-site, there is no effect on the other disk. Disk rotation involves inserting the off-site disk back into the system, quiescing the mirroring relationship between the two disks, and removing the installed disk. This can be accomplished very quickly and easily.

To facilitate description, therefore, it is henceforth assumed in this description that the backup disks are organized as pairs of RAID-0 aggregates. Primary volumes are backed up onto both disks in a pair. For every primary volume, there are two mirror relationships, one for each disk in the corresponding backup disk pair. Only one disk in the pair is active at any time. The other disk is inactive and is stored off-site and not used. This means that only one of the two mirror relationships is active at any time.

Periodically, the disks in the pair are swapped by a user, such as a network administrator. The storage server 2 is configured with a user-configurable disk rotation schedule. When it is time for rotation, a notification is sent to the user to rotate the disks. When the off-site disk is swapped back into the system, the corresponding mirror relationship is activated and the mirror is re-synchronized. In the event that the second disk of the pair is already present in the system, the backup target is automatically switched to the other disk. This is done to ensure uniform utilization of both disks in the pair. To provide a history of backups, a single PPI schedule is run on each mirror target.

Figure 4:
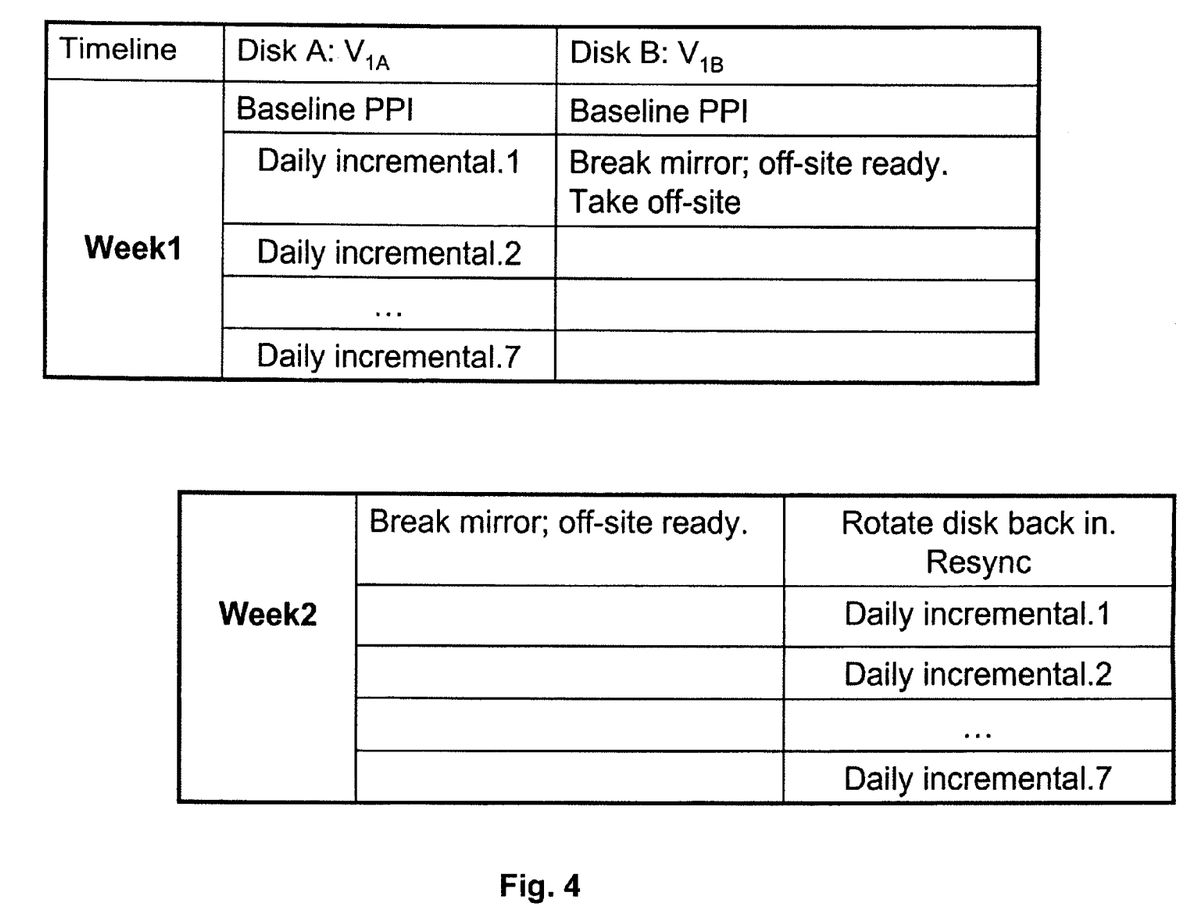
FIG. 4 illustrates an example of a schedule for data backup and disk rotation.

FIG. 4 shows an example of a backup disk rotation schedule for a primary volume $V_1$ that is to be backed up. Initially, a complete baseline PPI (full backup, or mirror) of the volume $V_1$ is saved on each disk, Disk A and Disk B, of a backup pair. The backup (mirror) volume stored on Disk A is designated volume $V_{1A}$, while the backup volume stored on Disk B is designated volume $V_{1B}$. Disk A is then made the active backup target, whereas Disk B is quiesced, removed and taken off-site.

The illustrated schedule involves swapping the active backup disk with the off-site (inactive) backup disk on a weekly basis. Incremental backups are also saved on the active backup disk on a daily basis. Of course, a different rotation schedule and/or incremental backup schedule could be used.

When it is time for rotation, Disk B is recoupled to the system, and the mirror relationship is resynchronized. This involves creating a new incremental backup of the primary volume $V_1$, on Disk B. Then Disk B is designated as the active backup disk, and Disk A is quiesced, removed and taken off-site. The process can continue in this manner indefinitely.

Figure 5:
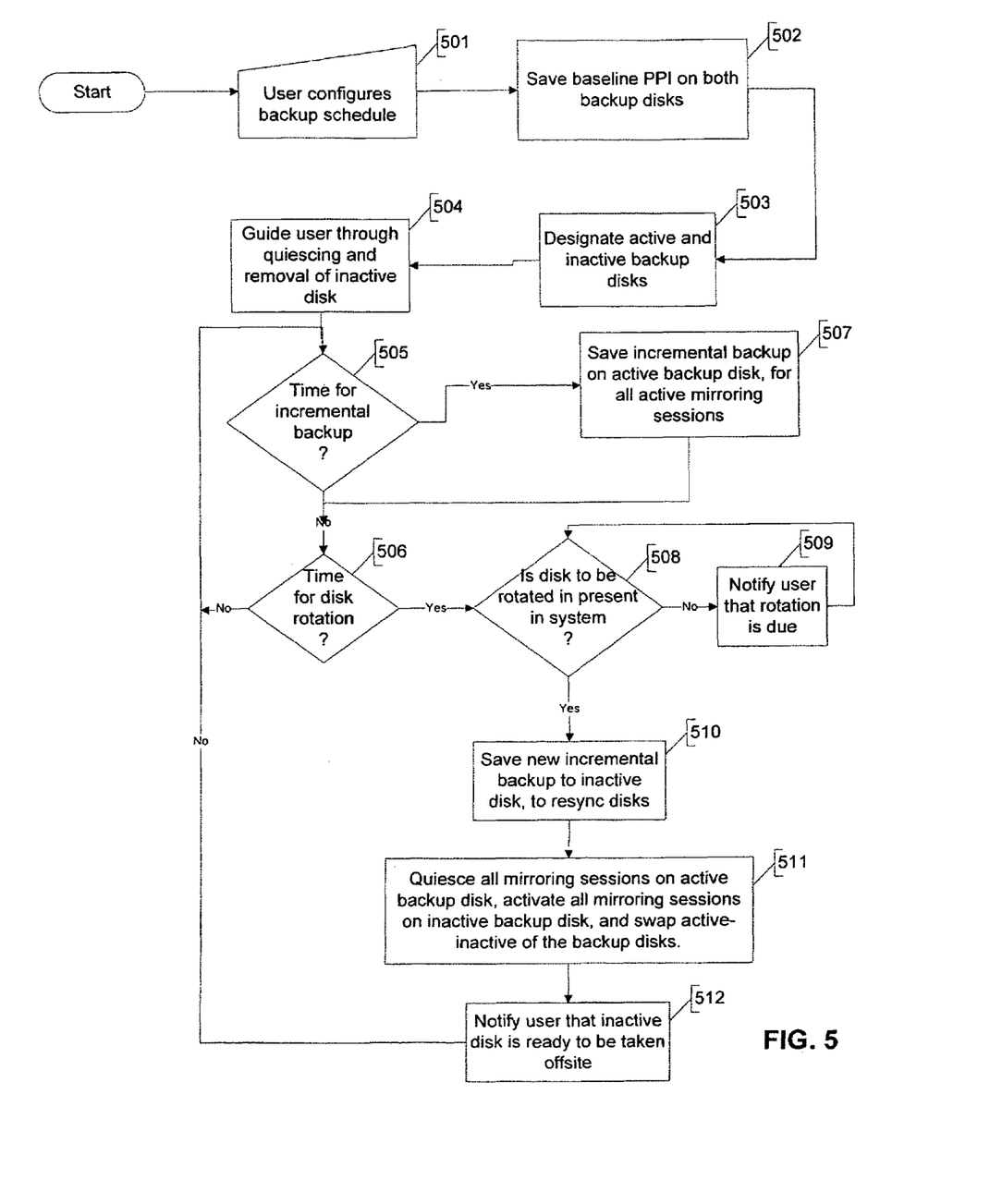
FIG. 5 is a flow diagram of a process for backing up data according to an embodiment of the invention.

FIG. 5 illustrates an example of the overall process of backing up data, according to the technique introduced here. In certain embodiments, the operations in FIG. 5 are performed by the mirroring layer 28 in the storage server 2, except those operations which are described as being performed by a user.

Figure 6:
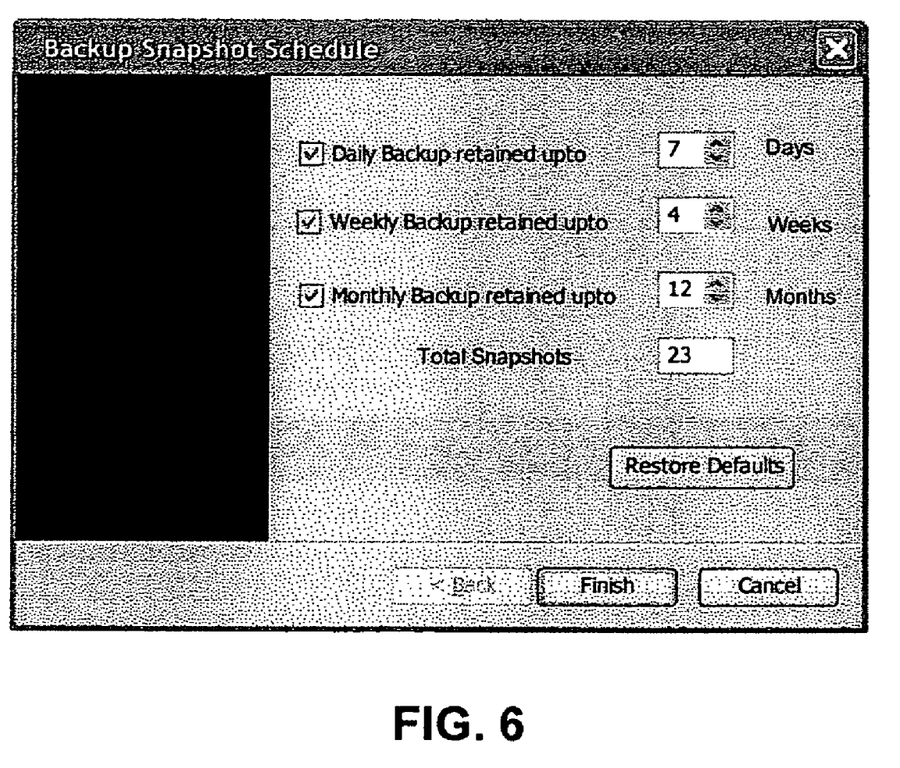
FIG. 6 shows an example of a graphical user interface for configuring a backup schedule.
Figure 7:
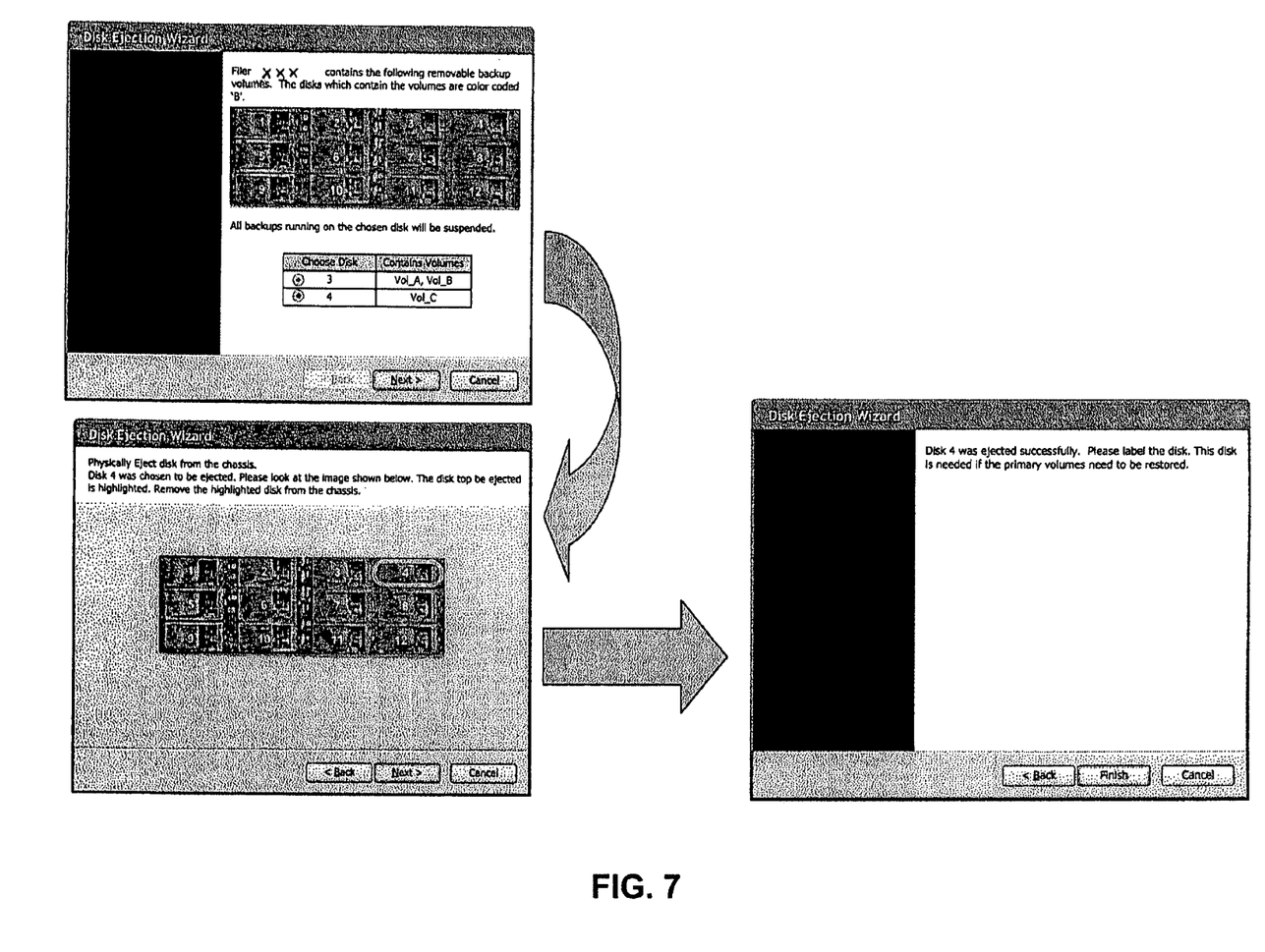
FIG. 7 shows an example of a graphical user interface for prompting a user to rotate backup disks.

Initially, at 501 a user configures a backup schedule on the storage server 2. This may be accomplished through a simple graphical user interface generated by the mirroring layer 28 of the operating system 20; an example of such a user interface is shown in FIG. 6. The storage server 2 then saves a baseline PPI on both backup disks, at 502. Next, the particular disks that are to be initially active and inactive are designated at 503. A simple user interface (e.g., wizard) such as shown in FIG. 7 may be employed to guide the user through that process.

After the initial PPIs have been created and the active and inactive backup disks have been designated, the user may remove the designated inactive backup disk from the system and take it off-site (which is preferable, for the best protection against disaster, although it is not mandatory). Accordingly, at 504 a simple user interface (e.g., wizard), such as shown in FIG. 7, guides the user through the process of safely quiescing backup sessions on the inactive disk and removing it from the system.

When it is time for an incremental backup (505), the storage server 2 saves an incremental backup on the active backup disk for all active mirroring sessions, at 507. When it is time for disk rotation (506), the storage server 2 determines at 508 whether the disk to be rotated in is present (installed) in the system. If the disk to be rotated in is not present in the system, the storage server 2 notifies the user at 509 that rotation is due. This notification may be provided through any suitable mode of communication, such as by email or through a graphical user interface.

If and when the disk to be rotated in is present in the system, the storage server 2 saves a new incremental backup on that disk at 510, to resynchronize the disks. At 511, the storage server 2 then quiesces all mirroring sessions on the active disk, activates all mirroring sessions on the inactive disk, and swaps the active-inactive statuses of the two backup disks. The storage server 2 then notifies the user at 512 that the inactive disk (which was previously the active disk) is ready to be removed and taken off-site. The process then repeats from 504, as described above.

If a backup disk (or aggregate) becomes full, the user is notified that the backup schedule is stalled. Three alternatives can be provided to make progress in that event: 1) the backup history (PPIs) on the disk can be deleted to free up space; 2) an entire backup volume can be deleted and backup operations descheduled for the corresponding primary volume; or 3) a new disk pair can be added to the system and the backup for some primary volume(s) can be moved to the new disk pair (this also means that the backup volumes for the moved primary volume(s) will be deleted, so the history of backups is lost).

A volume can be restored from the backups on either of the two disks in the disk pair. If both disks are present in the system, the available backup histories in both the disks are combined. If only one disk is present in the system, then the backups in the other disk are, of course, not available. During a restore operation, the selected backup disk is treated as the primary volume, and the actual primary volume is treated as the backup. The backup volume is synchronized to the primary volume. Once the synchronization is complete, the backup-primary relationship is broken. The removable disks are then treated as new backup pairs for the new primary volume.

To assist the user in handling the removable disks, simple media cataloging features are built into the mirroring layer 28. Information identifying the disk pair currently used for backup is stored in the storage server 2. In particular, the disk serial number is used to uniquely identify each disk. In addition, for every disk, the following properties regarding the state of the disk are also stored:

1) The physical state [In-box/Off-site]: This state indicates whether or not the disk is installed in the storage server 2.

2) Logical State [Active/Inactive/Corrupted]: This state indicates whether the disk is actively being used as a backup target or is in inactive (passive/quiesced) mode. A disk can be inactive even though the user does not remove it from the system. In that case, both disks in the pair can be present in the box even though only one is being used. A disk is corrupted if there are media errors or file system corruptions discovered during background scrubs.

3) Backup State [Writable, Archive, Compliance]: This state can be used to support advanced features in data protection, such as locking the back-up volume as a read-only copy (archive) or using it for regulatory compliance.

In addition, an "owner" (storage server) of each disk is recorded on the disk. If a disk is not owned by any storage server, then data will not be backed up to that disk. The user would have to choose to erase the contents of the disk and change the ownership. This is to prevent users from accidentally swapping disks between storage systems. The schema can be extended to provide additional authentication steps before data is recovered.

The main purpose of storing the above information is to identify and validate the data set on the disk and provide the appropriate information to the user to minimize mis-handling of back-up disks. The above-mentioned state information can be stored in the registry which resides on the root volume of the storage server, which resides in the primary data aggregate (i.e., on a set of disks separate from the removable disks being discussed here).

Figure 8:
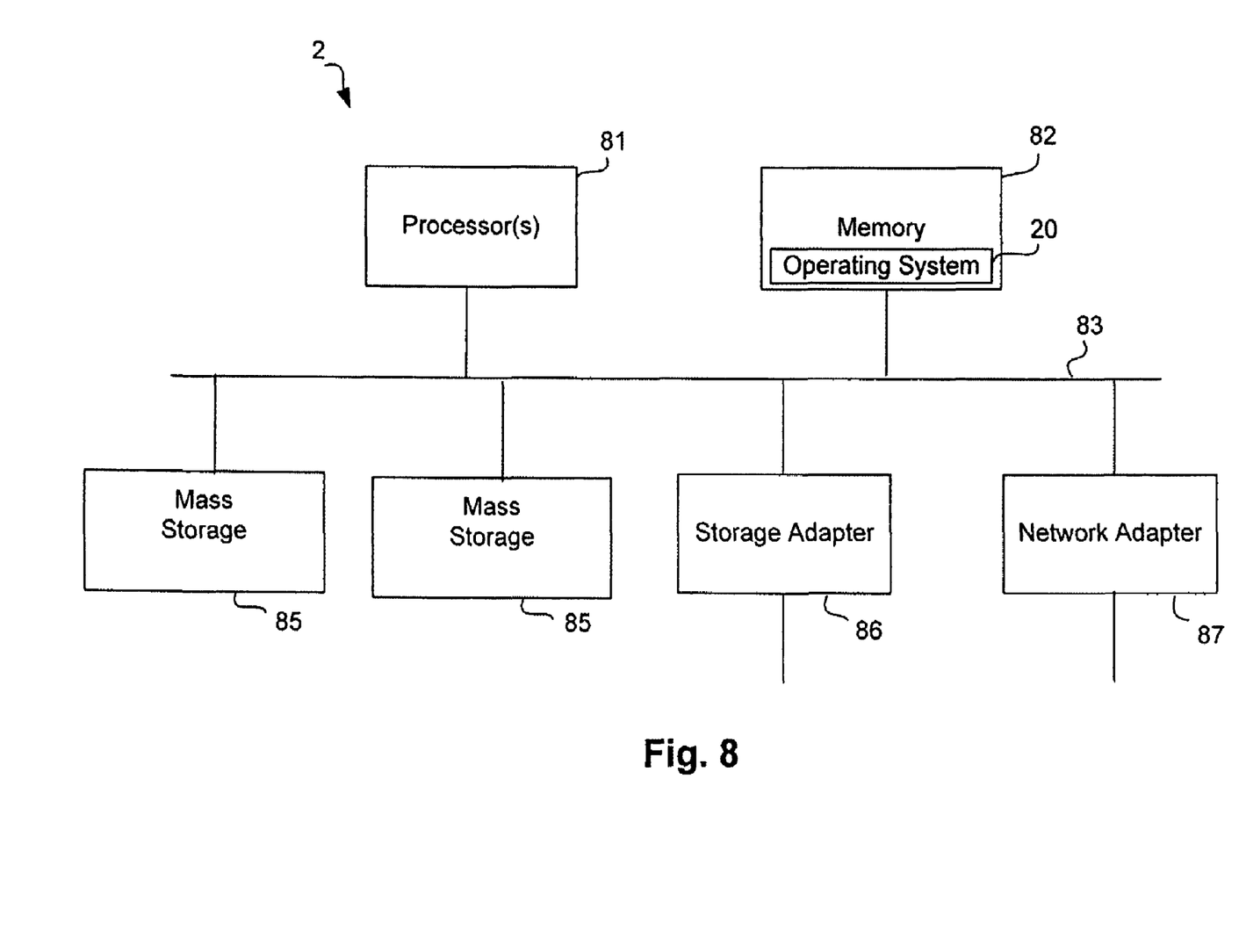
FIG. 8 is a high-level block diagram showing an example of the architecture of the storage server.

FIG. 8 is a block diagram showing an example of the architecture of the storage server 2 at a high level. Certain standard and well-known components which are not germane to the present invention are not shown. The storage server 2 includes one or more processors 81 and memory 82, each coupled to an interconnect 83. The interconnect 83 shown in FIG. 8 is an abstraction that represents any one or more buses, point-to-point connections, and/or other types of connections, which may include one or more appropriate bridges, adapters and/or controllers. The interconnect 83, therefore, may include, for example, a system bus connecting the processor(s) 81 to main memory, a form of peripheral component interconnect (PCI) bus, HyperTransport or industry standard architecture (ISA) bus, small computer system interface (SCSI) bus, universal serial bus (USB), Inter-IC (I2C) bus, or Firewire (IEEE standard 1394) connection.

The processors 81 are the central processing units (CPUs) of the storage server 2 and, thus, control its overall operation. In certain embodiments, the processors 81 accomplish this by executing software stored in memory 82. Such processor 81 may be, or may include, one or more programmable general-purpose or special-purpose microprocessors, digital signal processors (DSPs), programmable controllers, application specific integrated circuits (ASICs), programmable logic devices (PLDs), or the like, or a combination of such devices.

Memory 82 includes the main memory of the storage server 2. Memory 82 represents any form of random access memory (RAM), read-only memory (ROM), flash memory, or the like, or a combination of such devices. Memory 82 stores (among other things) the storage server's operating system 20, which can implement at least some of the techniques introduced here.

Also connected to the processors 81 through the interconnect 83 are multiple removable internal disks 85, a storage adapter 86 and a network adapter 87. The network adapter 87 provides the storage server 2 with the ability to communicate with remote devices, such as the clients 1, over a network and may be, for example, an Ethernet adapter, a Fibre Channel adapter, or the like. The storage adapter 86 allows the storage server 2 to access the external storage subsystem 4 and may be, for example, a Fibre Channel adapter or a SCSI adapter. Note that in alternative embodiments, the storage server 2 may not include any internal mass storage devices 85; in still other embodiments, the storage server 2 may include internal mass storage devices 85 but have no access to any external mass storage devices.

Another possible use of a backup storage set created as described above is to enable a second, independent storage server to back up or independently maintain the primary data. For example, after a storage set (one or more disks) is created with the primary data and then uninstalled from a first storage server, the storage set may be transported to and installed in a second storage server. The second storage server may be local to or remote from the first storage server and may not have any communication link with the first storage server. The second storage server can then service client requests, from a set of clients, directed to the mirror volume stored on the storage set. The set of clients serviced by the second storage server may be completely separate from the set of clients services by the first storage server, or they may be identical, or they may be overlapping sets of clients but not identical.

Thus, a cost-effective, reliable and highly portable data backup solution for a network storage system has been described.

Software to implement the technique introduced here may be stored on a machine-readable medium. A "machine-accessible medium", as the term is used herein, includes any mechanism that provides (i.e., stores and/or transmits) information in a form accessible by a machine (e.g., a computer, network device, personal digital assistant (PDA), manufacturing tool, any device with a set of one or more processors, etc.). For example, a machine-accessible medium includes recordable/non-recordable media (e.g., read-only memory (ROM); random access memory (RAM); magnetic disk storage media; optical storage media; flash memory devices; etc.), etc.

The term "logic", as used herein, can include, for example, hardwired circuitry, programmable circuitry, software, or any combination thereof.

Although the present invention has been described with reference to specific exemplary embodiments, it will be recognized that the invention is not limited to the embodiments described, but can be practiced with modification and alteration within the spirit and scope of the appended claims. Accordingly, the specification and drawings are to be regarded in an illustrative sense rather than a restrictive sense.

For example, although the storage server 2 is illustrated as a self-contained element, it may have a distributed architecture; for example, it may include a separate N- ("network") module and D- (disk) module (not shown). In such an embodiment, the N-module is used to communicate with clients 1, while the D-module includes the file system functionality and is used to communicate with the storage subsystem 4. The N-module and D-module communicate with each other using an internal protocol. Alternatively, the storage server 2 may have an integrated architecture, where the network and data components are all contained in a single box. The storage server 2 further may be coupled through a switching fabric to other similar storage servers (not shown) which have their own local storage subsystems. In this way, all of the storage subsystems can form a single storage pool, to which any client of any of the storage servers has access.

What is claimed is:

1. A method of operating a storage server, the method comprising:
   a) providing data storage and retrieval services via a network to a client;
   b) on a first storage set that includes a non-volatile mass storage device, creating a first mirror volume of a primary volume;
   c) on a second storage set that includes a non-volatile mass storage device, creating a second mirror volume of the primary volume;
   d) quiescing the second storage set;
   e) detecting a decoupling of the second storage set from the storage server;
   f) creating an incremental backup of the primary volume on the first storage set while the second storage set is not coupled to the storage server;
   g) detecting a re-coupling of the second storage set to the storage server; and
   h) in response to detecting said re-coupling,
      h)(1) synchronizing the second mirror volume with the primary volume, and
      h)(2) swapping active-inactive statuses of the first and second storage sets.

2. A method as recited in claim 1, further comprising:
   i) repeating said d) through h) with the roles of the first storage set and the second storage set swapped.

3. A method as recited in claim 1, wherein said quiescing the second storage set is in response to a user action.

4. A method as recited in claim 3, further comprising:
   prompting a user to cause the second storage set to be quiesced prior to said user action.

5. A method as recited in claim 1, further comprising:
   prompting the user to swap the first storage set and the second storage set, at a time subsequent to creation of the incremental backup.

6. A method as recited in claim 1, wherein said creating an incremental backup of the primary volume is performed according to a specified backup schedule.

7. A method as recited in claim 1, wherein the first storage set and the second storage set each comprise a RAID-1 aggregate including a plurality of disks.

8. A method as recited in claim 1, wherein the first storage set and the second storage set each comprise a RAID-0 aggregate including a plurality of disks.

9. A method as recited in claim 1, further comprising:
storing in the storage server, for each mass storage device in the first storage set and the second storage set, device state information including:
a first state value indicative of whether the mass storage device is coupled to the storage server; and
a second state value indicative of whether the mass storage device has an active or inactive status.

10. A method as recited in claim 9, further comprising using said device state information in the storage server to identify a current backup target from among the first and second storage set.

11. A method comprising:
a) operating a storage server which provides data storage and retrieval services via a network to a plurality of clients, including causing the storage server to maintain a primary data volume;
b) causing the storage server to create a first mirror volume of the primary volume, on a first storage set that includes a non-volatile mass storage device, a first mirror volume of a primary data volume;
c) causing the storage server to create a second mirror volume of the primary volume, on a second storage set that includes a non-volatile mass storage device;
d) causing the second storage set to be quiesced;
e) decoupling the second storage set from the storage server and moving the second storage set to a remote location relative to a location of the first storage set;
f) causing the storage server to create an incremental backup of the primary volume on the first storage set according to a backup schedule while the second storage set is not coupled to the storage server;
g) at a user-selected time after the incremental backup has been created, re-coupling the second storage set to the storage server;
h) synchronizing the second mirror volume with the primary volume;
i) swapping active-inactive statuses of the first mirror volume and the second mirror volume; and
j) repeating said d) through i), wherein roles of the first storage set and the second storage set are swapped at each repetition of said d) through i).

12. A method as recited in claim 11, wherein the first storage set and the second storage set each comprise a RAID-1 aggregate including a plurality of disks.

13. A method as recited in claim 11, wherein the first storage set and the second storage set each comprise a RAID-0 aggregate including a plurality of disks.

14. A storage server comprising:
a communication interface through which to communicate with a plurality of clients via a network;
logic to provide data storage and retrieval services to the plurality of clients; and
logic to:
create a first mirror data volume of a primary volume, on a first storage set that includes a non-volatile mass storage device;
create a second mirror volume of the primary volume, on a second storage set that includes a non-volatile mass storage device;
quiesce the second storage set;
detect a decoupling of the second storage set from the storage server;
create an incremental backup of the primary volume on the first storage set while the second storage set is not coupled to the storage server;
detect a re-coupling of the second storage set to the storage server; and
respond to detecting said re-coupling by
synchronizing the second mirror volume with the primary volume, and
swapping active-inactive statuses of the first mirror volume and the second mirror volume.

15. A storage server as recited in claim 14, wherein the second storage set is quiesced in response to a user action.

16. A storage server as recited in claim 15, further comprising:
logic to prompt a user to cause the second storage set to be quiesced prior to said user action.

17. A storage server as recited in claim 14, further comprising:
logic to prompt the user to swap the first storage set and the second storage set, at a time subsequent to creation of the incremental backup.

18. A storage server as recited in claim 14, wherein the incremental backup of the primary volume is created according to a specified backup schedule.

19. A storage server as recited in claim 14, wherein the first storage set and the second storage set each comprise a RAID-1 aggregate including a plurality of disks.

20. A storage server as recited in claim 14, wherein the first storage set and the second storage set each comprise a RAID-0 aggregate including a plurality of disks.

21. A storage server as recited in claim 14, further comprising:
logic to store in the storage server, for each mass storage device in the first storage set and the second storage set, device state information including:
a first state value indicative of whether the mass storage device is coupled to the storage server; and
a second state value indicative of whether the mass storage device has an active or inactive status.

22. A storage server as recited in claim 21, further comprising logic to use said device state information to identify a current backup target from among the first and second storage set.

* * * * *